Aug. 21, 1956 I. A. GROSS 2,760,056

RADIO TUNING APPARATUS

Filed May 27, 1950 2 Sheets-Sheet 1

INVENTOR.
IRVING A. GROSS
BY J. H. Douglas
His atty.

RADIO TUNING APPARATUS

Filed May 27, 1950

INVENTOR.
IRVING A. GROSS
BY
J. D. Douglas
His atty.

United States Patent Office 2,760,056
Patented Aug. 21, 1956

2,760,056

RADIO TUNING APPARATUS

Irving A. Gross, Cleveland, Ohio, assignor to Stewart-Warner Corporation, Chicago, Ill.

Application May 27, 1950, Serial No. 164,737

16 Claims. (Cl. 250—13)

This invention relates to radio tuning apparatus, and more particularly to a loop tuning device for a transmitter receiver combination which is effective only when the combination is operative as a receiver.

Miniature radio transceivers have been successfully built and operated for military use, the outstanding example being the familiar "Walkie Talkie" used extensively in World War II. The adaptation of such a device to civilian uses has been considered desirable, particularly for farmers and ranchers and other outdoor workers or sportsmen, enabling them to keep in touch with their homes or base points while engaged in work in the field or on the range. Other civilian uses will readily occur to any one possessed of ordinary imagination.

Such adaptation has never been successfully accomplished, however; principally, because of the weight of the device and the cost of manufacture. Consequently, I have developed a new device of similar nature, the circuit of which is the subject of my copending application, Ser. No. 170,409 filed June 26, 1950. The present application is concerned with the mechanical device used to tune the receiving circuit of my device and to prevent a similar tuning effect of the transmitter.

In the usual transceiver, the tuning is accomplished by use of a variable condenser which is removed from the transmitting circuit by electrically switching the circuits. While this type of device operates satisfactorily, the components are more expensive and heavier than necessary as I will demonstrate.

Loop tuning by means of a closed loop inductively linked to the antenna tank coil has heretofore not been considered satisfactory because there has been no means devised to avoid the effect of the closed loop on the antenna during transmission. However, by my invention, I am able to use this method of tuning the receiver and by mechanical manipulation make the loop inoperative during transmission. This is done by a mechanical device which is not heavy and requires no electric switch or wires or connections of any kind, yet the change from receiving to transmitting is done by a single movement of a slide since all the necessary switches are moved by the slide at the same time as the mechanical movement of the tuning coil to its inoperative position.

Further advantages of my invention, and the invention itself, will become apparent from the following specification and drawings which form a part thereof. Like parts are denoted by like reference characters throughout the drawings.

Briefly, my invention comprises a closed loop or circuit which may be inductively linked with the tank coil to a greater or lesser degree to change the inductance of the tank coil and therefore the resonant frequency of the circuit to tune the radio to different frequencies. This coil is adapted to be moved adjustably by the tuning lever or knob when the instrument is set for receiving which is the normal position. However, means is provided to turn the closed loop to a position substantially perpendicular to the tank coil, i. e., parallel to the flux lines, avoiding any inductive linkage and therefore making the closed loop of no effect. This same means operates the necessary switches in changing from a receiving to a transmitting circuit.

Figure 1:
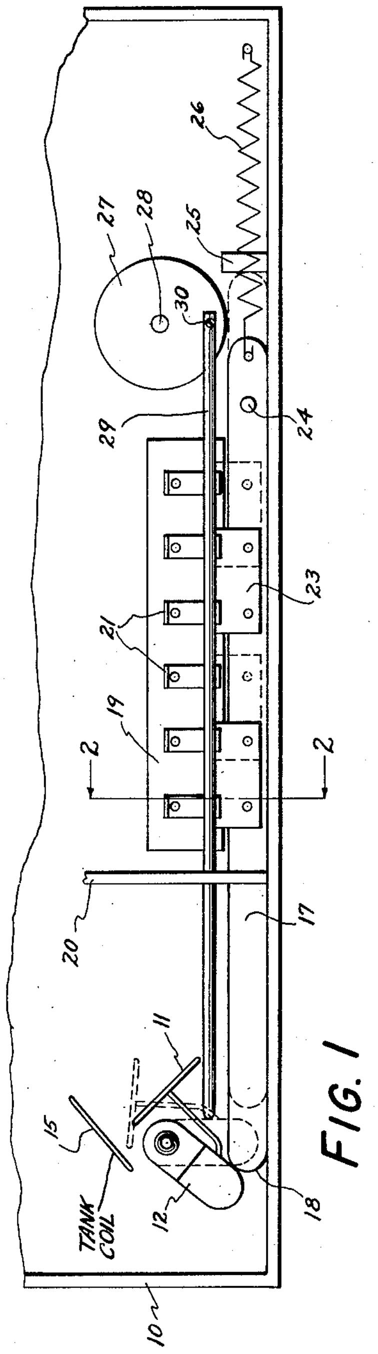
Fig. 1 is a top plan view of my invention.
Figure 3:
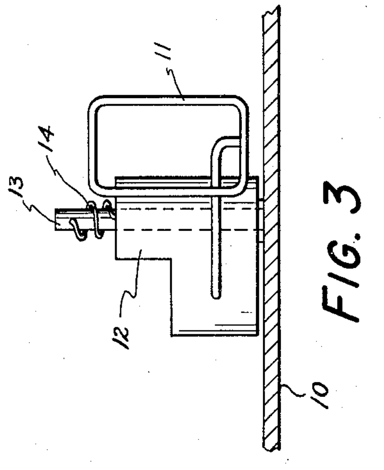
Fig. 3 is a side plan view of the tuning coil and its mounting isolated from its surroundings.
Figure 2:
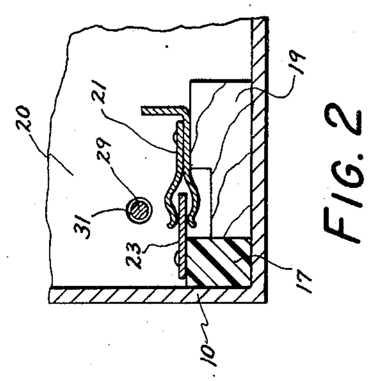
Fig. 2 is a partial sectional view along line 2—2 of Fig. 1.

More specifically, and in reference to the drawings, my device in one embodiment is illustrated mounted in the case or chassis 10 of a miniature transceiver suitable for portable use. The closed circuit, which may be either a flat disk or a loop 11, is mounted on a block 12 of some light weight insulating material. This block may be formed substantially as shown in Fig. 3, although its shape is not important, and is pivoted on a post 13 fixed to the case 10. A small coil spring 14 is engaged between the post 13 and the block 12 and urges the block toward the position shown in dashed lines in Fig. 1. This latter position I term the receiving position, for it is in this position that there is an inductive linkage between the closed loop 11 and the tank coil 15 shown diagrammatically in the figure. The position shown by the solid line is the transmitting position, and it will be noted that, in this position, the loop 11 is substantially perpendicular to the tank coil.

The slide member 17, which has a rounded end 18 holding the block 12 in the transmitting position, is also formed of a light weight plastic. It is slidably mounted in the case 10, being held in place by the switch block 19 and the partition 20. This slide, in addition, to moving the loop 11 to its transmitting position, also operates the electrical switches necessary to change the circuit from receiving to transmission or vice versa. These switches may, in a simple embodiment, comprise electrical contacts 21 formed of some resilient conducting material, such as phosphor bronze or brass. The contacts 21 are mounted on a switch block 19 in position to be engaged by copper or brass plates 23 mounted on the slide 17. As shown, these plates 23 are adapted to bridge between one or another pair of contacts dependent on the position of the slide. A means is provided for manual movement of the slide which may be simply a post 24 mounted on the slide 17 and long enough to extend through the case 10. A stop 25 is also provided to position the slide in proper position. In the embodiment shown, a tension spring 26 is provided which tends to hold the slide in its normal receiving position, requiring that it be held manually in the transmitting position.

The tuning device comprises a disk or knob 27 pivoted on a post 28. A rod 29 is pivotally pinned to the knob 27 by a screw 30. This rod 29 is loosely journalled in a hole 31 in the partition 20 and extends to a point where it may abut the block 12 if the slide 17 is withdrawn to its receiving position. It is then apparent that turning the knob 27 by means outside the case, and not illustrated, will cause the rod 29 to reciprocate and thereby cause a greater or lesser linkage between the loop 11 and the tank coil 15, thus tuning the set. It is obvious that the knob 27 could be replaced by a crank without going beyond the scope of my invention. The hole 31 is large enough to allow the slight changes in alignment of the rod 29 necessitated by its being carried in an arc by the knob 27.

It will be noted that the action of the rod 29 and the slide 17 are wholly independent, and that there is no danger of interference. Furthermore, once the receiver is tuned, it will remain in adjustment for many cycles of transmitting and receiving and will not require resetting.

Figure 4:
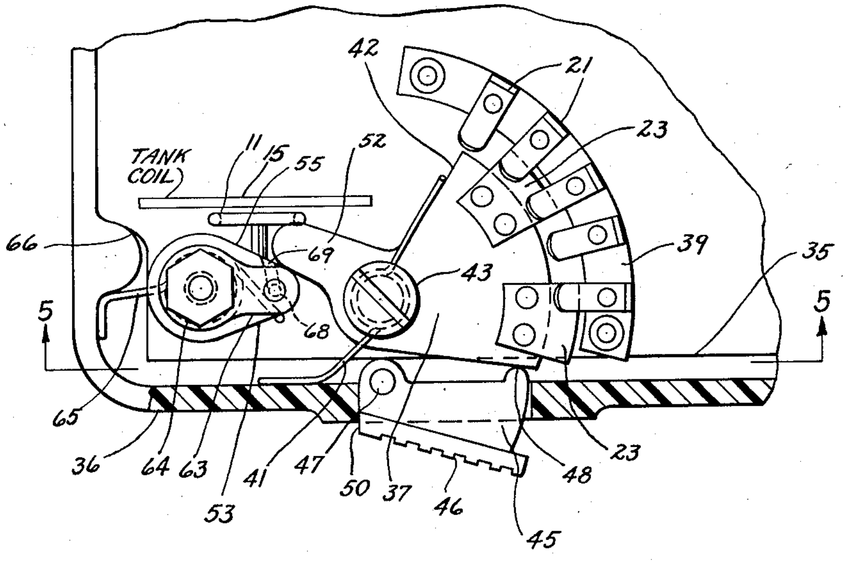
Fig. 4 is a top plan view of a second embodiment of the invention with a portion of the case broken away.
Figure 5:
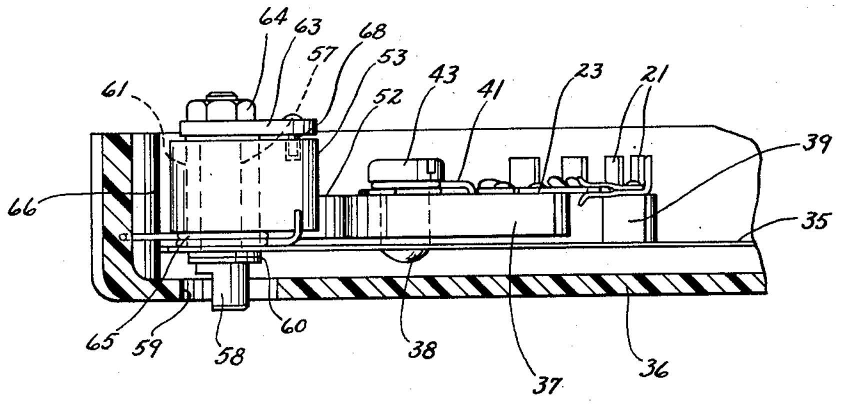
Fig. 5 is a sectional view along line 5—5 of Fig. 4 with certain rear portions not shown for the sake of clarity.

A second embodiment of the invention is shown in Figs. 4 and 5. This embodiment is adapted for mounting on a sheet metal chassis 35 which may be placed into a case 36 of a plastic material. The slide member 37 is formed in a fan shape and is pivoted to the chassis 35 by a pin 38. The fixed contacts 21 in this embodiment are mounted on an arcuate block 39 which may be riveted to the chassis 35. The contact plates 23 mounted on the member 37 make the contacts for the various circuits in a similar manner to that previously described. As in the first embodiment, the slide is biased to a receiving position by a spring 41. In this latter embodiment, the spring 41 is a coil spring engaged between the case 36 and an edge 42 of the slide member 37 and coiled about the pin 38. The head 43 of the pin 38 holds the spring 41 in position.

The slide member is moved by any convenient type of push button. The device illustrated (Fig. 4) comprises a button member 45 having a ribbed surface 46 and pivoted to the case 36 at 47. A rounded projection 48 engages the member 37 and is adapted to move it when the button member 45 is pressed inwardly. It will be readily apparent that other types of push buttons will accomplish the same result and, therefore, may be used without exceeding the scope of the invention. The outward movement of the button member 45 is limited by the engagement of a shoulder 50 with the wall of the case 36.

An arm 52 is formed on the slide member 37 in position to engage the loop carrying block 53 to move it when the switches are changed. The block 53 carries a tuning loop or disk 11 in a manner similar to the first embodiment and is moved by the slide member in each embodiment so as to carry the loop from an inoperative or transmitting position to an operative or receiving position. The block 53 presents a flat surface 55 to the arm 52 which will then slide easily with a rolling motion along that surface when moving the block. The tuning device which operates only when the switches are in the receiving position comprises a shaft 57 having one end 58 adapted to receive a knob (not shown) of any customary type. This end 58 extends into or through a hole 59 in the case 36, and the knob therefore will be disposed outside in an available position.

Within the case, the shaft is of smaller diameter providing a shoulder against which a washer 60 may seat. This washer provides a bearing surface against the chassis 35. Within the chassis, a bushing 61 surrounds the shaft 57. Thus the shaft is held in place on the chassis between the bushing 61 and the washer 60.

A second shoulder is formed in the shaft 57 at the edge of the bushing 61. A tuning arm 63 fits against this shoulder and extends beyond the bushing. A nut 64 threaded onto the shaft against the arm 63 fixes it in place and holds the assembly on the chassis 35. It is apparent that the arm 63 could be keyed or otherwise kept from rotating on the shaft 58. The block 53 is rotatably journalled on the bushing 61 and is kept from sliding off by the arm 63 which extends beyond the bushing over the edges of the block. Thus the block is free to turn relative to the tuning arm. A spring 65, engaged between a boss 66 formed in the case 36 and the block in a counterclockwise direction (Fig. 4) against the switch member arm 52.

The tuning arm 63 extends outwardly substantially the same distance as the block 53 and near its outer extremity carries a pin 68 extending downwardly toward the block. A slot 69 in the block receives the pin but allows a clockwise motion of the arm 63, relative to the block 53, only until the pin 68 reaches the end of the slot. Further clockwise movement of the tuning arm 63 causes the block to be carried along against the biasing force of the spring 65. Thus, it is apparent that when the slide member 37 is in the receiving position as shown (Fig. 4), the shaft 57 may be rotated to turn the arm 63 which will, in turn, move the loop 11 as in the previously described embodiment. However, when the button member 45 is pressed to change the switches to the transmitting position, the arm 52 on the slide member 37 will engage the block 53 to move it out of control of the tuning arm 63 and to move the loop 11 to its ineffective position. It will be apparent that the proportions of the shaft 57 could be made such that it would retain a fixed position as the slide member was moved so that the tuned position of the loop, once fixed would be retained without the need for retuning the device every time it was desired to receive a message. It will also be apparent that the slot 69 is not necessary for the operation of the device, but that the pin 68 would operate the block 53 by engaging its side.

Having thus described my invention, I am aware that numerous and extensive departures may be made therefrom without departing from the spirit or scope of my invention.

I claim:

1. In apparatus of the class described having a chassis on which are mounted various components of a transmitter-receiver circuit including an input tank coil; mechanical means for tuning the input circuit comprising pivoted means having a loop means providing a closed electrical circuit mounted thereon, said loop means being located adjacent said tank coil, spring means urging said pivoted means in one direction, dual means to move said pivoted means in the other direction, the first comprising a slide operated when changing said circuit from transmitting to receiving, said slide engaging said pivotal means and thereby adapted to move said loop means to a position where it is inductively uncoupled from said tank coil, the second of said dual means being operative only when the circuit is receiving and comprising adjustable means engageable with said pivoted means whereby said loop means may be positioned adjustably with respect to said tank coil to alter the inductance thereof.

2. In apparatus of the class described having a chassis on which are mounted components of a transmitter-receiver circuit including an input tank coil; mechanical means for tuning the input circuit comprising pivoted means having a loop means providing a closed electrical circuit mounted thereon, adjustment means engageable with said pivoted means adapted to move said pivoted means selectively when receiving, and slide means engageable with said pivoted means adapted to move said loop means to a position where said loop means is not inductively coupled with said tank coil when said slide means is moved to an alternate position.

3. In a radio device of the class described having a chassis on which are mounted the components of a transmitter-receiver circuit including an input tank coil; mechanical tuning means comprising an insulated block pivotally mounted on said chassis, a closed loop fixed to said block adjacent to said tank coil, spring means adapted to urge said block in one direction, switch means on said chassis adapted to change the circuits of said device from transmitter to receiver, slide means slidably disposed on said chassis and cooperative with said switch means, said slide means being engageable with said block to move said loop to an inductively decoupled position when transmitting, and adjustment means operative when receiving, comprising a rod in abutting engagement with said block and slidably disposed on said chassis, crank means connected to said rod to operate the rod selectively to position said loop in a plurality of positions of varying degrees of inductive coupling with said tank coil.

4. In apparatus of the class described having a chassis on which are mounted the components of a transmitter-receiver circuit including an input tank coil; mechanical tuning means comprising a block pivotally mounted on said chassis, a loop carried by said block, spring means engaging said block to urge it in one direction, adjustable means engaging said block to move it adjustably in the other direction whereby said loop is moved to a plurality of positions of varying inductive coupling with said tank coil.

5. In apparatus of the class described having a chassis on which are mounted the components of a transmitter-receiver circuit including an input tank coil; mechanical tuning means comprising a block pivotally mounted on said chassis, a loop carried by said block, spring means engaging said block urging it in one direction, a rod slidably mounted on said chassis in abutting engagement with said block, and crank means to move said rod adjustably to change the position of said loop whereby said loop is moved to increase or decrease its inductive coupling with said tank coil.

6. In apparatus of the class described having a chassis on which are mounted the components of a transmitter-receiver circuit including an input tank coil; mechanical change means comprising a block pivotally mounted on said chassis, a loop carried by said block, spring means engaging said block to urge it in one direction, sliding switch means slidably disposed on said chassis adapted to change said circuit from receiving to sending, and, at the same time engage said block to move it against said spring to a position inductively decoupled from said tank coil.

7. In apparatus of the class described having a chassis on which are mounted the components of a transmitter-receiver circuit including an input tank coil; mechanical change means comprising a block pivotally mounted on said chassis, a loop carried by said block, spring means engaging said block to urge it in one direction, sliding switch means slidably disposed on said chassis adapted to change said circuit from receiving to sending, and, at the same time, engage said block to move it against said spring to a position inductively decoupled from said tank coil, hand engaged means by which said switch means may be manually moved and a second spring to urge said switch means normally to a position in which said circuit is connected for receiving.

8. In apparatus of the class described having a chassis on which are mounted the components of a transmitter-receiver circuit including an input tank coil; mechanical change means comprising a block pivotally mounted on said chassis, a loop carried by said block, spring means engaging said block to urge it in one direction, sliding switch means slidably disposed on said chassis adapted to change said circuit from receiving to sending, and, at the same time engage said block to move it against said spring to a position inductively decoupled from said tank coil, hand engaged means by which said switch means may be manually moved, a second spring to urge said switch means normally to a position in which said circuit is connected for receiving, and adjustable means engaging said block adapted to move said block when said switch is in a receiving position whereby said loop is moved to a plurality of positions of varying amounts of inductive coupling with said tank coil.

9. Apparatus of the class described comprising a chassis, a block pivotally mounted on said chassis, a loop carried by said block, means to move said loop selectively comprising a shaft rotatably disposed in said chassis, an arm on said shaft extending adjacent said block adapted to engage said block to move it in one direction and spring means adapted to hold said block against said arm.

10. Apparatus of the class described comprising a chassis, a block pivotally mounted on said chassis, a loop carried by said block, means to move said loop selectively comprising a shaft rotatably disposed in said chassis, an arm on said shaft extending adjacent said block adapted to engage said block to move it in one direction and spring means adapted to hold said block against said arm, and means to move said loop to a fixed neutral position comprising a slide member pivotally mounted on said chassis having an arm extending adjacent said block, said slide member adapted to be moved, thereby causing said last named arm to engage said block to turn it.

11. Apparatus of the class described comprising a chassis, a block pivotally mounted on said chassis, a loop carried by said block, means to move said loop selectively comprising a shaft rotatably disposed in said chassis, an arm on said shaft extending adjacent said block adapted to engage said block to move it in one direction and spring means adapted to hold said block against said arm, and means to move said loop to a fixed neutral position comprising a slide member pivotally mounted on said chassis having an arm extending adjacent said block, said slide member being adapted to be moved, thereby causing said last named arm to engage said block to turn it, and push button means engaging said slide member to move it.

12. Apparatus of the class described comprising a chassis, a block pivotally mounted on said chassis, a loop carried by said block, means to move said loop selectively comprising a shaft rotatably disposed in said chassis, an arm on said shaft extending adjacent said block adapted to engage said block to move it in one direction and spring means adapted to hold said block against said arm, and means to move said loop to a fixed neutral position comprising a slide member pivotally mounted on said chassis having an arm extending adjacent said block, said slide member being adapted to be moved, thereby causing said last named arm to engage said block to turn it, and switch means in conjunction with said slide member adapted to change a circuit from a receiving to a sending circuit when said member is moved.

13. In a radio transceiver, a transformer coil in a tank circuit which is tunable to a radio frequency carrier wave, a closed loop disposed in reactive coupling relation to said coil, pivoted means for supporting said loop, a resilient member for urging said pivoted means and its loop toward the tank circuit, two push-rods effective to press against said pivoted means in opposition to the force of said resilient member, a tuning device manipulatably operable to set one of said push-rods, thereby to fix the degree of coupling between said coil and said closed loop, and a sliding mechanism operable upon the other of said push-rods to cause that amount of diminution in the degree of coupling, whereby the tank circuit is tuned to the frequency of the carrier wave which is to be transmitted.

14. In a device according to claim 13 a plurality of stationary and movable switch components constituting means for conditioning the circuits of said radio transceiver to receive or to transmit, the movable switch components being mounted on that one of the push-rods which is operable by said sliding mechanism.

15. In a two-way radio apparatus, a sliding operating member, a spring tensioned pivoted arm disposed so as to be actuated by an end of said member, movable switch contact means carried by said member, a movable tuning loop located on an end of said arm, a tuning coil inductively coupled to said loop, fixed contact means for engaging said movable contact means, said member acting to shift said arm to thereby vary the tuning of said apparatus, resilient means secured to said member and acting to oppose the movement of said member, and a transmit-receive system controlled by said contact means, said system including a tank circuit which includes said tuning coil.

16. In a two-way radio apparatus, the combination with a manipulatable sliding mechanism of switching means operable by such mechanism to condition the circuits of said apparatus for transmitting a modulated carrier wave of predetermined frequency, a short-circuited loop coupling member inductively coupled to a tank circuit which is one of the components of said radio apparatus, said member being adjustably mounted with respect to said tank circuit and being adjustable to a normal position relative thereto, means operable by said mechanism for adjusting said member relatively to said tank circuit to a position which fixes the frequency of the transmitted carrier wave, and resilient means for biasing said member toward said normal position, said resilient means operating in response to release of said mechanism to restore said member to said normal position.

References Cited in the file of this patent

UNITED STATES PATENTS

| | | |
|---|---|---|
| 1,903,665 | Adey | Apr. 11, 1933 |
| 2,292,842 | Oberle | Aug. 11, 1942 |
| 2,318,361 | Bischoff | May 4, 1943 |
| 2,513,796 | Goddard | July 4, 1950 |